Feb. 19, 1963 HUNG-CHI CHANG 3,078,219

SURFACE TREATMENT OF SILICON CARBIDE

Filed Nov. 3, 1958

INVENTOR.
HUNG-CHI CHANG
BY
Frederick Shapoe
ATTORNEY 3,078,219

SURFACE TREATMENT OF SILICON CARBIDE

Hung-Chi Chang, Pittsburgh, Pa., assignor to Westinghouse Electric Corporation, East Pittsburgh, Pa., a corporation of Pennsylvania Filed Nov. 3, 1958, Ser. No. 771,380
13 Claims. (Cl. 204—143)

This invention relates to the treatment of a surface of crystalline silicon carbide (SiC), and it relates particularly to methods of treating the surface, or a portion thereof, of a single crystal of silicon carbide that may but need not be a part of a fabricated semiconductor device.

It has been established that the quality of semiconductor devices depends largely upon the condition of the surface of the semiconductor element present. For example, a rough surface can prevent obtaining adequate contact with an electrode or with a second portion of a semiconductor material when a junction is to be formed. Similarly, an imperfection on the surface of a semiconductor element can act as a conducting path which may short the device containing it.

Etching generally is effective to remove imperfect materials from a surface to reveal, or uncover, the relatively undisturbed subsurface of the material etched. However, normal ambient temperature chemical etching cannot be used in the treatment of silicon carbide because silicon carbide is chemically inert to most reagents at about room temperature. Moreover, although the carbide does react with certain oxides, salts, metals and gases at elevated temperature (see Harman et al., "A Review of Silicon Carbide," Atomic Energy Commission publication, BMI–748), most of the chemical reactions are considerably unpredictable or uncontrollable and attack the bulk of silicon carbide present in addition to its surface. Furthermore, commercial considerations make it important that etching can be carried out after at least partial fabrication of the crystal into a device. Chemical etching is more likely to destroy the metal leads and contacts of a device, as by dissolving them, than to attack the silicon carbide. Accordingly, even the known chemical reactions of SiC at elevated temperatures are not desirable for correction of surface defects in view of the lack of suitable control in their practice.

Another type of etching that may be considered is electrolytic etching. However, prior to the present invention there has been no satisfactory method of etching silicon carbide electrolytically of which I am aware.

It is a primary object of the present invention to provide a process for treating the surfaces of monocrystalline silicon carbide to etch away undesirable surfaces.

It is another object of this invention to provide an electrolytic etching process for the treatment of a surface of a silicon carbide single crystal that is easily practiced; that does not involve attack on the bulk of the silicon carbide crystal; that can be applied after the crystal has been fabricated into a semiconductor device; that is controllable and can be applied to preselected surface areas of the single crystal; and that can be conducted at room temperature.

In accordance with my invention, the foregoing objects are attained by subjecting a monocrystalline wafer of silicon carbide to an electrolytic etching process. In this manner, reaction between the silicon carbide and the etchant can be obtained. Furthermore the process is capable of extremely fine control and reaction can be limited to the surface of the crystal, or a portion thereof, and the bulk of the silicon carbide is not attached.

The process of this invention is carried out by subjecting a silicon carbide single crystal to an electrolyte of the proper conductivity, which contains ions that react with silicon carbide at the selected surface of the crystal upon the application of an electric current. While either D.C. or A.C. current can be used, because the etching reaction is not reversible, D.C. is preferred. The reaction products are removed from the point of reaction on the crystal by solubilizing in the electrolyte, or by being washed from the surface by the electrolyte or a washing solution, or by volatilizing and leaving the electrolyte and crystal surface, depending on the nature of the process applied.

There are several preferred ways of carrying out the present invention, each being significant for a particular reason. Where the crystal being treated is part of a fabricated semiconductor device, certain of the procedures are of greater utility than others whereas other procedures are of greater convenience when, for example, the single crystal is to be etched before it is provided with ohmic contacts or the like. For example, and as will be more fully described hereinafter, the process can be carried out using the silicon carbide surface as the anode in one instance, part of the silicon carbide can serve as the cathode in a second instance, and both an anode and a cathode other than the silicon carbide can be provided in still another instance. The various ways in which the crystal and electrodes can be utilized provide versatility in obtaining the desired surface in silicon carbide and also permit control of the process, particularly where the crystal itself becomes one of the electrodes.

The handling of the electrolyte in practicing the invention also can vary depending on the procedure to be used. By way of example, the crystal can be immersed wholly or in part in the electrolyte. In another embodiment the electrolyte can be projected against the surface at the point that etching is to take place. At times the electrolyte can be projected as a continuous stream while in other instances that is not necessary.

The foregoing factors in addition to operational procedures involving insulative masking, circuit breaking and the like characterize this invention with unusually numerous points of control. This, of course, is of extreme importance in applications involving delicate devices, such as a fabricated semiconductor, and items that are very small as in this invention.

The electrolytes suitable for practicing this invention are those aqueous electrolytes containing oxidizing ions such as oxygen containing ions, for example $ClO_4^-$ and $OH^-$, and halogen ions, preferably fluoride and chloride ions, and of suitable conductivity. The conductivity of the electrolyte should be such that the conductance of an electrical current through the silicon carbide at the point to be etched is at least as great as the conductance through any other point on the silicon carbide crystal. The part or point on the silicon carbide being etched should be electrically positive. Thus, consider treating a P-N junction-containing silicon carbide device physically connected in a circuit with another electrode, e.g. a platinum electrode, where the surface imperfection to be etched away is on the N side of the crystal and the current is to be passed in the reverse direction. With this arrangement, the current must pass through the electrolyte more readily than across the junction. Accordingly, the electrolyte conductivity must be chosen with that in mind. If the conductivity of the electrolyte became so low that the conductance of the circuit through the P side of the crystal exceeded that through the N side, then the imperfection on the N side would be substantially by-passed rather than being etched away as before. Of course where the device is masked over its entire surface with the exception of the imperfection, the electrolyte conductivity becomes of lesser importance for there is but one current path available.

The conductivity of the electrolyte can be adjusted to the predetermined value as desired. It is preferred, however, to control the conductivity of the electrolyte by adding to it a non-ionizing liquid that is miscible therewith. By way of example, an alcohol, such as methanol or ethanol, can be added to aqueous electrolytes for the foregoing purposes. Of course other non-ionic liquids such as hydrocarbons, ethers and the like can be used with equal facility. Moreover, the diluting liquid can be chosen with a view to solubilizing an etching product. The use of a nonionizing liquid for conductivity control is frequently more desirable than simple water dilution of the electrolyte because the water itself will provide ions in the solution.

Typical examples of electrolytes that may be used in practicing this invention include acids such as hydrogen fluoride (HF), hydrogen chloride (HCl), perchloric acid ($HClO_4$), and the like which provide oxidizing ions that can react with silicon carbide. Such salts as sodium fluoride (NaF), ammonium chloride ($NH_4Cl$), potassium acid fluoride ($KHF_2$), sodium acid fluoride ($NaHF_2$) and similar compounds may be used in conjunction with the acids or in place of them, the latter being desirable where the device treated contains a metal part that may be attacked by acid, or the acid otherwise presents a hazardous situation. Other compounds such as the alkali metal hydroxides (e.g. NaOH), or carbonates (e.g. $Na_2CO_3$), may also be used either alone or in conjunction with any of the foregoing compounds. The use of a mixture of compounds may allow the use of oxidizing ions, e.g. oxygen or hydroxide ions, that react with the silicon carbide to produce insoluble silicon oxides. The oxides can then react with the halogen to result in a product that is soluble in the electrolyte, thereby removing it from the surface being treated.

For purposes of limiting reaction speed or attack on any metal part present as, for example, an ohmic contact or the like, it is usually desirable to use a low concentration of significant ions in the electrolyte. For similar reasons low currents on the order of one to 100 milliamperes generally are used for the ordinary crystal having a surface area to be etched on the order of about 4 millimeters square. While higher concentrations of the electrolyte or higher currents will speed the reaction, that may result in a crystal damage as a consequence of oversight. Moreover, I have found that the rate of solubilization of the etching products is not very rapid in many instances; accordingly, it is preferred to provide conditions of concentration and current that will permit the etching product to dissolve substantially as rapidly as it is formed. It has been found that a potential within the range of 0.5 to 25 volts can readily be used in this process.

Practice of the invention may be best understood and visualized upon reference to the attached drawing in which FIG. 1 is an apparatus for etching a silicon carbide surface in which the crystal acts as an anode;

Figure 1:
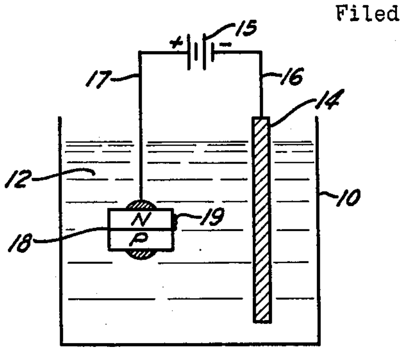

Referring now to the drawings, in FIG. 1 the numeral 10 indicates a container made of material that will resist attack by the electrolyte. For example, when hydrogen fluoride is used as the electrolyte, the container may be made of a suitable plastic, such as polyethylene, or other material that resists attack by HF. In other instances where acid attack is not significant, glass, ceramic or the like may be used as desired. An electrolyte 12 is placed in the container. An inert cathode 14 made of a material such, for example, as platinum or carbon, is connected to one side of battery 15 by a lead 16 and is immersed in the electrolyte. The other side of the battery is connected through a lead 17 to the silicon carbide crystal 18 to be etched. The numeral 19 indicates an imperfection that is to be etched away from the surface of the silicon carbide crystal.

When the circuit is closed as is shown, current flows through the lead 17 into the silicon carbide crystal 18 on its N side, through the defect 19 and then into the electrolyte 12 and completes its circuit by entering the electrode 14 and going back to the battery. The silicon carbide at the imperfection will react with the oxidizing ions in the electrolyte and be removed from the surface. When sufficient reaction has occurred or it is desired to stop etching for other reasons, e.g. for inspection or cleaning, the crystal or the electrode 14 can be withdrawn, or a switch (not shown) in the external circuit can be opened.

In the instance shown above, the electrolyte conductivity must be higher than that of the N-P junction. The conductivity would not be material if every part of the crystal device other than the imperfection were masked with a suitable insulation.

Figure 2:
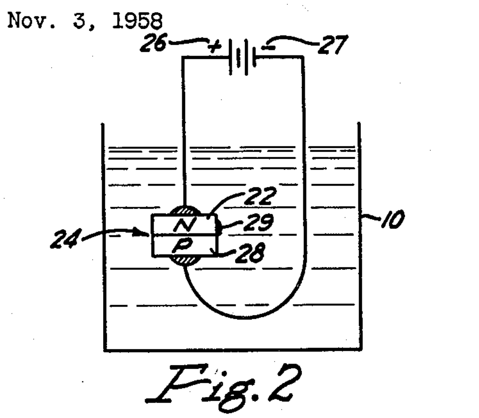
FIG. 2 is an apparatus in which the crystal serves as an anode and as a cathode.

In FIG. 2 is shown a system whereby an auxiliary electrode is not required, the crystal itself serving as both anode and cathode. In this embodiment, the N side 22 of the crystal 24 is in electrical connection with the positive pole 26 of the battery while the negative pole 27 of the battery is connected to the lead from the P side 28 of the crystal. The imperfection 29, shown on the crystal at the junction, can be etched away in accordance with the present invention by providing an electrolyte containing oxidizing ions where the electrolyte conductivity is higher than that of the N-P junction but lower than that of the crystal bulk material. In this embodiment the current preferentially will flow through the imperfection to the electrolyte, and then to the P side of the crystal thereby etching the imperfection at the junction on the N side. By changing the arrangement shown to the extent of using current flow in the forward direction, e.g. into the P side of the crystal, an imperfection on the P side of the junction can be etched away.

Figure 3:
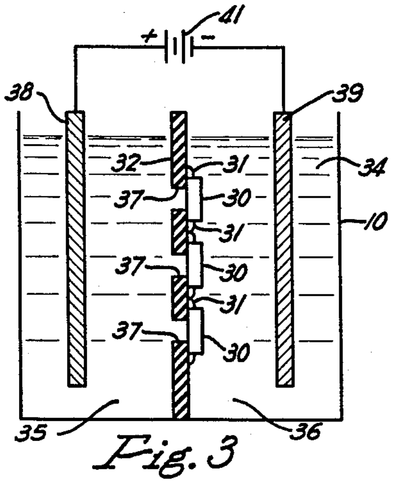
FIG. 3 is an embodiment in which a large number of silicon carbide crystals can be etched at a single time without the necessity of attaching leads to the crystals.

The embodiments above discussed are particularly advantageous where the single crystal being treated has already been fabricated into a device. In those instances the ohmic connections to the crystal serve as a means to suspend the device in the electrolyte. Where such leads are not available, as with crystals that have yet to be fabricated, the embodiment shown in FIG. 3 is particularly suitable. This embodiment is also of interest for commercial application for it constitutes a system in which a large number of crystals can be etched at a single time with great ease.

Referring now to FIG. 3, single crystals that are to be etched, and which are identified by the numeral 30, are attached by means of a cement 31 to the surface of an insulating member 32 immersed in the electrolyte 34. By using a soft insulating member, it is possible simply to press the crystals therein and no cement or other holding means is needed. While three crystals are shown for illustrative purposes, it will be appreciated that any number could be used. The insulating member 32 is of a size and shape sufficient to divide container 10 into two compartments 35 and 36. Apertures, or holes 37 are provided through member 32. These holes can be of any shape, but suitably are sufficiently small in size to permit complete closure by the crystals 30 associated with each hole thereby preventing any contact between the electrolytes in the two compartments. The purpose of these holes is to permit the electrolyte in compartment 35 to communicate, electrically, with the crystals.

An anode 38 (e.g. graphite) and a cathode 39 (e.g. graphite) are placed in compartments 35 and 36 respectively. These electrodes are then connected externally of the resulting device to a battery 41. When the circuit is thus complete a dual-cell system results with the silicon carbide crystals acting as cathodes with respect to anode 38, and acting as anodes with respect to cathode 39. As an anode, each crystal will be anodically etched along the surfaces exposed to electrolyte in compartment 36. This embodiment is considered particularly useful where large portions of the crystal surface are to be etched.

Figure 4:
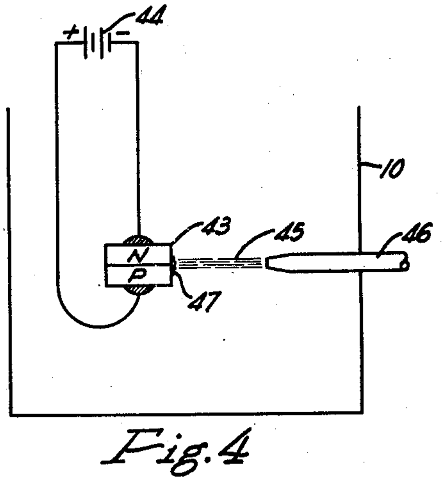
FIG. 4 shows an embodiment in which the electrolyte is projected against the surface to be treated.
Figure 5:
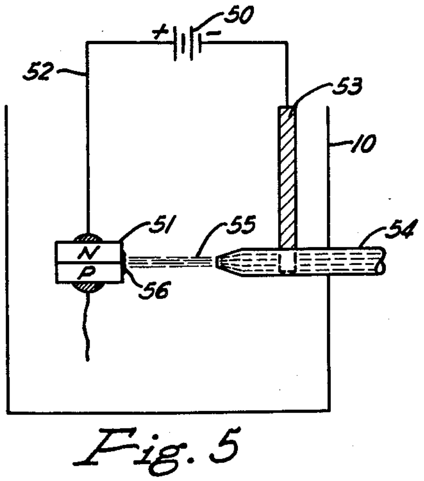
FIG. 5 shows another embodiment in which a flowing stream of electrolyte is used.

The process embodiments that are practiced as shown in FIGS. 4 and 5 are of particular interest when etching a fabricated device, especially where etching is to be accomplished along the junction. In FIG. 4, a junction-containing crystal 43 is connected in a closed circuit with the battery 44 as before. Then the electrolyte 45, having a conductivity higher than that of the junction in the direction of current flow, is projected from a source 46 against the imperfection 47 that is to be removed by etching. In view of the conductivity relationship, etching takes place as long as the electrolyte is in contact with the crystal at the defect. It should be noted that current flow can be reversed in this embodiment in the same manner and with the same results as described in connection with FIG. 2. Indeed current flow can be in either direction in any case where a junction containing crystal is being etched.

FIG. 5 shows a modification of FIG. 4. Here the battery 50 is connected to the crystal 51 by a lead 52 and also to a separate electrode 53 at its negative pole. The electrode or cathode 53 extends into a conduit 54 provided for the electrolyte 55. In this embodiment, the electrolyte 55 is projected against the crystal at the surface 56 to be etched in a manner such that a continuous stream extends from the base of the cathode to the crystal. This is essential to provide a complete circuit for current flow and, therefore, etching to take place.

It can be observed that in the method as practiced in accordance with FIG. 4 or FIG. 5, the etching products will leave the crystal surface under the influence of gravity, if they are solid, or enter the surrounding atmosphere if gaseous. Moreover, as the electrolyte strikes the crystal surface, its force exerts a scouring action thereby aiding in the removal of etching products. If desired, additional conduits can be provided through which cleaning solutions can be projected at the crystal for purposes of removing etching products. These figures also show a container; while that is unnecessary, it is desirable to collect electrolyte and etching products.

The foregoing are now considered the best embodiments in the practice of the present invention. These are merely illustrative and should not be construed as limiting the invention.

In early testing of this invention a large number of tests were made to determine, in a qualitative way, the effectiveness of representative electrolytes and the rate of etching that could be expected. In one series of tests in which the silicon carbide served as the anode and a platinum cathode was provided, as shown in FIG. 1, and aqueous electrolytes as specified hereinafter, the following results were achieved. Using 10 weight percent aqueous perchloric acid as the electrolyte and 100 milliamperes current, 0.0003 inch was etched from the surface of the crystal in 15 minutes. With a mixture of 5 percent aqueous perchloric acid and one percent aqueous hydrofluoric acid (present in equal volumes) and 100 milliamperes current, 0.0009 inch was removed in 13 minutes.

In companion experiments a 10 percent solution of aqueous hydrofluoric acid at 100 milliamperes etched 0.0002 inch in twenty minutes. With the same electrolyte while using a current of 300 milliamperes, 0.0007 inch was removed in the same period of time.

When 5 percent aqueous ammonium acid fluoride ($NH_4F.HF$) was used as the electrolyte at 100 milliamperes current, etching occurred to the extent of 0.0001 inch in 20 minutes. A 10 percent aqueous sodium carbonate solution etched away 0.0015 inch of the crystal in 60 minutes at 200 milliamperes current. When the carbonate electrolyte was used, a coating of etching products on the crystal surface was removed at intervals by momentary immersions in hydrofluoric acid.

Etching at rates as high as those just stated is not necessary in the large majority of instances. Crystals for semiconductor applications generally are used when they have the appearance of reasonable perfection. The etching that is accomplished on such crystals is largely to make certain that imperfections, such as shorts and the like, are not present rather than to remove obvious defects. For such reasons, the electrolyte concentration is normally less than 10 percent and the currents used are below about 100 milliamperes and usually on the order of 1 to 50 milliamps. With such current and electrolyte levels, experience has shown that etching for a short period of a few minutes is sufficient for producing the desired results. Many recent etching experiments made in accordance with this invention have been conducted with 1 to 10 weight percent hydrofluoric acid that was mixed with 2½ to 30 times its volume of methyl alcohol. For example, one electrolyte was made by mixing 8 cc. of 4 percent hydrofluoric acid with 100 cc. of methyl alcohol. Other electrolytes used in recent runs have been made with such materials as sodium fluoride and sodium carbonate in a 1 to 10 percent concentration and diluted with alcohol as just stated. In most of these instances 1 to 10 milliamps. of current were used and etching extended for periods up to about two minutes with satisfactory results. In these and other runs, it has been determined that uniformity in etching is more readily achieved when the electrolyte conductivity is lower than that of the crystal being treated.

There has been no discussion presented above concerning current densities used in the practice of this invention. The very small dimensions of the crystals and the even smaller dimensions involved where but a small portion of the surface is to be etched in addition to other factors, such as surface curvature and its degree of imperfection, make it too tedious to determine current densities even as a rough approximation. Accordingly, it is most practical simply to make a trial of etching in accordance with the description above and if the rate is found to be too fast or too slow, adjust the current, and hence its density, in the apparent manner. In that way satisfactory etching will be carried out without a need to be aware of the exact current density used.

In most of the discussion presented above, the crystals are referred to or shown to contain a junction. This has been done since junction-containing crystals normally are fabricated to the extent of being provided with leads and they in turn are a convenient way of suspending the crystal and of connecting it to a current source. However, it should be understood that doped crystals can be etched in accordance with the present invention without regard to the presence or absence of a junction. It may also be noted that in etching a junction-containing crystal, the current is fed into the crystal on the side thereof that is to be etched; accordingly, where etching is to take place on both sides of the junction, the current flow will be reversed after one side has been etched.

From the foregoing discussion and description, it is apparent that the present invention provides a unique and highly effective method for use in providing good surfaces on silicon carbide single crystals. The process can be carried out at room temperature conditions, as well as at elevated temperatures and is subject to control through substantially any of the elements used in its practice.

In accordance with the provisions of the patent statutes, the principle of the invention has been explained and there has been described what is now believed to be its best embodiment. However, it should be understood that the invention can be practiced otherwise than as specifically described.

I claim as my invention:

1. A method of etching the surface of crystalline silicon carbide which comprises applying to the surface of the silicon carbide an electrolyte consisting essentially of an aqueous solution having dissolved therein approximately of from 1 to 10% by weight of a compound which will ionize to produce ions capable of oxidizing silicon carbide in the presence of an electrical current and up to 30 times the volume of the aqueous solution of a water-miscible, relatively non-ionizing liquid, and passing an electrical current from a relatively stationary cathode to such surface to render it anodic at a potential not in excess of 25 volts and at a current density of the order of from 1 to 100 milliamperes per 16 square millimeters of said surface.

2. A method of anodically etching the surface of a silicon carbide single crystal comprising immersing at least a surface portion of said silicon carbide crystal in an electrolyte consisting essentially of an aqueous solution having dissolved therein approximately from 1% to 10% by weight of a compound which will ionize to produce ions capable of oxidizing silicon carbide in the presence of an electrical current and up to 30 times the volume of the aqueous solution of a water-miscible, relatively non-ionizing organic liquid, the electrolyte having a lower electrical conductivity than that of the bulk silicon carbide, and passing an electrical current from a relatively stationary cathode to the surface portion to render it anodic at a potential not in excess of 25 volts and at a current density of the order of from 1 to 100 milliamperes per 16 square millimeters of surface area in the electrolyte.

3. A method of etching the surface of a silicon carbide single crystal having a P-N junction which comprises subjecting such a crystal to an electrical potential not in excess of 25 volts to render the surface to be etched on one side of the P-N junction anodic and to pass a current of a density of approximately from 1 to 100 milliamperes per 16 square millimeters of area, and bringing an electrolyte into contact with the surface to be etched, the electrolyte having a conductivity higher than the conductivity of the junction in the direction of current flow but lower than the conductivity of the bulk silicon carbide, said electrolyte containing oxidizing ions capable of reacting with silicon carbide under the influence of an electric current and said electrolyte being projected against said surface as a continuous stream from a cathode to said crystal surface.

4. A method of etching the surface on one side of an N-P junction contained within a silicon carbide single crystal which comprises applying a potential not in excess of 25 volts to said surface and across said junction to render the said surface anodic, and then applying an electrolyte upon the said surface to be etched, said electrolyte consisting essentially of an aqueous solution having dissolved therein approximately from 1 to 10% by weight of a compound that will ionize to produce oxidizing ions capable of reacting with silicon carbide in the presence of an electrical current, and said electrolyte having a conductivity that is higher than the conductivity of the junction in said crystal in the direction of current flow but lower than the conductivity of the bulk silicon carbide crystal and the potential passing an electrical current of a density of the order of from 1 to 100 milliamperes per 16 square millimeters of surface.

5. A method of etching a junction-containing silicon carbide single crystal wherein a surface extending across said junction is to be etched, which comprises passing an electrical current from a relatively stationary cathode into said crystal on a side having a first conductivity characteristic whereby to render the side anodic while contacting the surface with an electrolyte consisting essentially of an aqueous solution having dissolved therein approximately from 1 to 10% by weight of a compound that will ionize to produce oxidizing ions capable of reacting with said silicon carbide under the influence of an electric current, the electrical current being applied at a voltage not exceeding 25 volts and a current density of from approximately 1 to 100 milliamperes per 16 square millimeters of surface on the said side, the electrolyte having a conductivity higher than the conductivity of the junction but of a conductivity lower than that of the bulk silicon carbide and then passing said current into the other side of said crystal while in contact with said electrolyte.

6. A method in accordance with claim 1 in which said electrolyte includes oxygen containing ions.

7. A method in accordance with claim 1 in which said electrolyte contains halogen ions.

8. A method in accordance with claim 7 in which said electrolyte contains fluorine ions.

9. A method according to claim 2 in which said electrolyte includes oxygen containing ions.

10. A method according to claim 2 in which said electrolyte contains halogen ions.

11. A method according to claim 10 in which said electrolyte contains fluorine ions.

12. A method of etching a surface of a silicon carbide single crystal which comprises passing a current from a relatively stationary cathode through said crystal rendering the silicon carbide surface anodic at a potential not in excess of 25 volts and a current of approximately from 1 to 100 milliamperes per 16 square millimeters of surface while its surface to be etched is in contact with an electrolyte consisting essentially of from about 1 to 10 percent by weight of an alkali metal carbonate.

13. A method of etching a silicon carbide single crystal which comprises passing a current from a relatively stationary cathode through said crystal rendering the silicon carbide surface anodic at a potential not in excess of 25 volts and a current of approximately from 1 to 100 milliamperes per 16 square millimeters of surface while its surface to be etched is in contact with an aqueous hydrogen fluoride electrolyte consisting essentially of about 1 to 10 percent by weight of hydrogen fluoride and up to 30 times its volume of a water-miscible, non-ionizing organic liquid.

References Cited in the file of this patent

UNITED STATES PATENTS

| | | |
|---|---|---|
| 909,831 | Auferman | Jan. 12, 1909 |
| 1,416,929 | Bailey | May 23, 1922 |
| 2,273,704 | Grisdale | Feb. 17, 1942 |
| 2,469,569 | Ohl | May 10, 1949 |
| 2,656,496 | Sparks | Oct. 20, 1953 |
| 2,783,197 | Herbert | Feb. 26, 1957 |
| 2,798,846 | Comstock | July 9, 1957 |
| 2,846,346 | Bradley | Aug. 5, 1958 |
| 2,858,256 | Fahnoe | Oct. 28, 1958 |
| 2,861,931 | Faust | Nov. 25, 1958 |
| 2,871,177 | Comstock | Jan. 27, 1959 |
| 2,939,825 | Faust | June 7, 1960 |

FOREIGN PATENTS

| | | |
|---|---|---|
| 608,557 | Great Britain | Sept. 16, 1948 |
| 770,754 | Great Britain | Mar. 27, 1957 |

OTHER REFERENCES

Bell System Tech. Journal, vol. 35, March 1956, pages 333–347.

Proceedings of the I.R.E., vol. 41, No. 12, December 1953, pages 1706–1708.

Keeleric et al.: "New Processes For Machining and Grinding," National Research Council, Report No. MAB-18–M, Jan. 18, 1952, pages 1–8.